Patented Apr. 15, 1924.

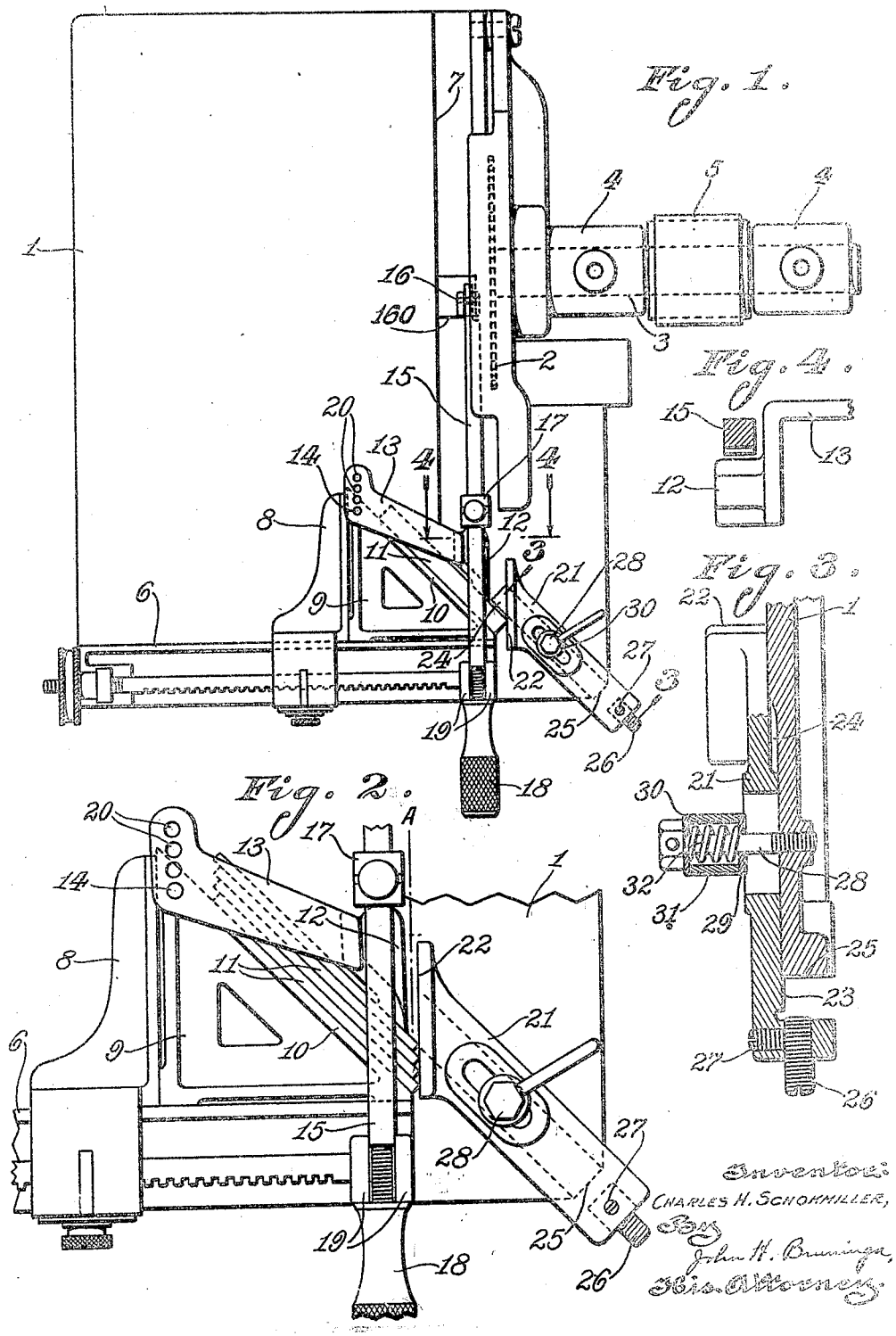

1,490,234

UNITED STATES PATENT OFFICE.

CHARLES H. SCHOKMILLER, OF ST. LOUIS, MISSOURI.

COMPOSING-ROOM SAW.

Application filed July 18, 1921. Serial No. 485,688.

*To all whom it may concern:*

Be it known that I, CHARLES H. SCHOKMILLER, a citizen of the United States, and residing at St. Louis, Missouri, have invented the new and useful Improvement in Composing-Room Saws, of which the following is a specification.

This invention relates to cutting machines and more particularly to cutting off saws, such as are used in composing rooms for trimming slugs, rules, etc., used in printing work.

It is often necessary in setting up a piece of work in form to miter the ends of the slugs or rules so that they may be set at right angles to one another. In this work great accuracy is required and various forms of gages have been devised for setting the work so that the cut will be accurately made.

One of the objects of this invention is to provide improved means for setting the work in performing mitering operations.

Another object of this invention is to provide means whereby the dimensions of the work may be used to obtain a gage setting.

Another object of this invention is to provide simple and effective means for clamping the work in an inclined position.

Another object of this invention is to provide improved means for clamping a gage or other device which may be quickly loosened and reset and which will yieldingly retain the device until it can be positively clamped.

Further objects will appear from the detail description taken in connection with the accompanying drawing, in which:

Figure 1 shows a plan view of a composing room saw embodying this invention;

Figure 2 is an enlarged detail of the gage and the clamping device;

Figure 3 is a section on line 3—3, Figure 1; and

Figure 4 is a section on line 4—4, Figure 1.

Referring to the accompanying drawing 1 designates the table of a composing room saw which is provided with a cutting tool 2 mounted on a shaft 3 suitably mounted in bearings 4 and arranged to be driven by any suitable means such as the belt 5. The table is provided with the usual carriage 6 arranged to operate along a guide (not shown) and adapted to carry the work past the cutting tool in a well known manner.

The carriage 6 is further provided with a guide or rest 8 against which the work is set before clamping so as to insure a straight cut.

In accordance with this invention the carriage is provided with a back rest 9 adapted to be set against the perpendicular faces of the carriage 6 and the rest 8 and having an inclined face 10 against which the work may be set. The work 11 may then be pressed against the surface 10 to give it an inclined position with respect to the cutting tool and the clamp 12 mounted on an arm 13 pivoted at 14 to the rest 9 may be brought into engagement therewith to hold it in position. The clamping rod 15 pivotally mounted at 16 on a block 160 sliding in a groove 7 in the table, carries an adjustable abutment 17 adapted to engage the curved rear surface of the clamp 12. The rod 15 is also provided with a clamping handle 18 adapted to engage an upstanding fork 19 on the carriage as shown in Figures 1 and 2. It will be noted that by screwing up on the handle 18 the abutment 17 will be drawn against the clamp 12 which in turn will be brought to bear against the work lying on the face 10 of the back rest 9 to securely clamp the work in inclined position. The arm 13 is provided with a series of holes 20 each adapted to be placed in engagement with the pivot 14 for clamping different sizes of work.

In order to cut a mitre accurately the work is first cut accurately to length. After this has been done, the work must be placed against the inclined rest 9 in such a position that the line of cut will pass exactly through the intersection of the end and the side of the piece. To set the work in such a position, a gage 21 having its gaging face 22 arranged parallel to the line of cut, must be set at such a position that when the work is placed in the position shown in Figures 1 and 2, one corner thereof may be brought against the gage face 22 and the other corner will lie exactly in the line of cut. When so set the distance between the face 22 and the line of cut which is represented by the line A in Figure 2 will be equal to the thickness of the work multiplied by the sine of the angle of the inclination of the surface 10. In accordance with this invention the gage 21 is so arranged that this dimension may be set off directly from the thickness of the piece.

A gage 21 is provided with a downwardly projecting rib or fin 23 adapted to engage a groove 24 in the surface of the table 1, this groove having the same inclination as the surface 10 of the rest 9. Guided by this groove the gage may be moved back and forth along said inclination. The edge of the table 1 is provided with a finished surface 25 perpendicular to the direction of movement of the gage 21 and adapted to be engaged by the end of an adjusting screw 26 when moved forward to the limit of its travel, said limit being set by the adjustment of the screw 26.

This adjustment is made so that when the screw 26 engages the abutment 25, the surface 22 will be exactly in the line of cut. This initial setting can be made by placing a piece of scrap metal in the clamp 12 and cutting it off with the cutting tool so as to establish the line of cut. The gage surface 22 may then be brought up against this cut surface and the screw 26 may then be set to engage the abutment 25 after which said screw will be clamped in position by an auxiliary clamping screw 27. An index setting is thus obtained in accordance with which any other setting may be made. With any thickness of work, it is now only necessary to loosen the gage 21 and retract it sufficiently to allow insertion of the work between the abutment 25 and the screw 26, the gage being moved up until the screw firmly engages the piece and then clamped. This final setting will automatically set off the required distance between the gage surface 22 and the line of cut A for mitering a piece of the thickness used in making the setting. It will be noted that this adjustment coincides exactly with an actual physical dimension of the work, and does not depend on any measuring or setting according to measurements on the part of the operator. An exact adjustment is thus obtained.

In order to clamp the gage 21, a clamping screw 28 is provided which screws into the table 1. Upon this screw are mounted a pair of washers 29 and 30 between which are placed a short tube 21 and within this tube a spring 32 bearing against the washers 29 and 30. It will be seen that by means of this arrangement when the screw 28 is loosened, the spring 32 will force the washer 29 against the gage 21 to frictionally retain the gage in position; when, however, the screw is further tightened, the spring will compress until the tube 31 contacts with both washers; any further tightening will then cause the gage to be unyieldingly clamped to the table.

It will, therefore, be seen that this invention accomplishes its objects. Novel means are provided for clamping and holding the work in an inclined position for mitering the ends. This clamp is adapted to different thicknesses of work and may be quickly and easily set. A gage is provided which is adjustable along the inclination of the work so as to automatically caliper and set off a gage setting in accordance with a function of the angle of inclination and in accordance with the thickness of the work to be operated upon. Clamping arrangements are provided by means of which the gage is yieldingly clamped in position while being accurately set, after which the clamping may be made unyielding by turning the screw 28 to clamp the gage by means of the washers 29 and 30 and the tube 31.

It is obvious that various changes may be made in details of construction without departing from the spirit of this invention; it is, therefore, to be understood that this invention is not to be limited to the specific details shown and described.

Having thus described the invention, what is claimed is:

1. In a machine of the character described, a cutting tool, a table, means for holding the work at an inclination with respect to the line of cut, and an end gage independent of said means having a work face parallel to the line of cut and mounted for adjustment along said inclination.

2. In a machine of the character described, a cutting tool, a table, and means for holding the work at an inclination with respect to the line of cut, an end gage for setting the work, and means for adjusting the initial setting of said gage.

3. In a machine of the character described, a cutting tool, a table, means for holding the work at an inclination with respect to the line of cut, an end gage for setting the work, and means for adjusting the initial setting of said gage, and for making a final setting in accordance with said initial setting.

4. In a machine of the character described, a cutting tool, a table, means for holding the work at an inclination with respect to the line of cut, an end gage for setting the work, and means for adjusting the initial setting of said gage, and for setting off the gauged dimension from said initial setting.

5. In a machine of the character described, a cutting tool, a table, and means for holding the work at an inclination with respect to the line of cut, and an end gage adjustable in accordance with a dimension of the work and a function of the angle of inclination.

6. In a machine of the character described, a cutting tool, a table, means for holding the work at an inclination with respect to the line of cut, and an end gage having means for making an adjustment to coincide with a transverse dimension of the work.

7. In a machine of the character described, a cutting tool, a table, means for holding the work at an inclination with respect to the line of cut, an end gage adjustable along said inclination, and adjusting means adapted by direct engagement to adjust said gage in accordance with a transverse dimension of the work.

8. In a machine of the character described, a cutting tool, a table, means for holding the work at an inclination with respect to the line of cut, and an end gage having calipering means for setting the gage.

9. In a machine of the character described, a cutting tool, a table, means for holding the work at an inclination with respect to the line of cut, and an end gage having calipering means for setting the gage in accordance with a function of the angle of inclination.

10. The combination with a support and a slide thereon, of means adapted to yieldingly clamp said slide on said support, and means whereby said clamping means may be made to unyieldingly clamp said slide to said support.

11. In a machine of the character described, a work clamp, an inclined abutment loosely mounted thereon and adapted to hold the work at an inclination, and a variably pivoted jaw adapted to clamp the work against said abutment.

12. The combination with a support and a movable element thereon, means adapted to yieldingly clamp said element, and means whereby said clamping means may be made to unyieldingly clamp said element to said support.

13. The combination with a support and a movable element thereon, a yielding element adapted to yieldingly clamp said element, and a rigid element adapted to unyieldingly clamp said element.

14. The combination with a support and a movable element thereon, a yielding element, an abutment for said element adapted to yieldingly clamp said element, and a rigid element adapted to engage said abutment to unyieldingly clamp said element.

15. The combination with a support and a movable element thereon, a yielding element, an abutment for said element, a spring engaging said abutment to yieldingly clamp said members, and a rigid tube enclosing said spring and adapted to engage said abutment to unyieldingly clamp said member.

In testimony whereof I affix my signature this 29th day of June, 1921.

CHARLES H. SCHOKMILLER.